Oct. 4, 1932.   W. J. O'NEILL ET AL   1,880,976
JOURNAL BEARING
Filed April 3, 1930

INVENTORS:
William J. O'Neill.
William E. Irvine.
By H. S. Bailey.
ATTORNEY.

Patented Oct. 4, 1932

1,880,976

UNITED STATES PATENT OFFICE

WILLIAM J. O'NEILL, OF DENVER, COLORADO, AND WILLIAM E. IRVINE, OF SALT LAKE CITY, UTAH

JOURNAL BEARING

Application filed April 3, 1930. Serial No. 441,240.

Our invention relates to a new type of journal bearing for the journals of locomotive engines.

And the objects of our invention are:—

First, to provide a journal bearing for the journals of locomotive engines that will prevent the friction of the bearing on the journal that is caused by the expansive forces to which the bearings and the journals of locomotives are subjected when they are heated.

Second, to provide a new type of journal bearing that is especially adapted to support heavy loads on axles and shafts that receive and transmit the speed and power of high speed engines and especially that class of engines that are used in steamships and flying machines where there is a continuous vibratory motion and constant torsional strains on the journals of the engines against their bearings.

Third, to provide a journal bearing that is provided with brasses of any suitable alloy that are safeguarded against accidental displacement from its supporting box.

Fourth, to provide a simple, practical journal bearing that is less expensive to manufacture than those in use and one in which the brasses are fitted loosely enough to be very quickly removed when worn out and be replaced by new ones in very much less time than the brasses can be removed from bearings of the type in which they are pressed into their boxes by hydraulic or other pressure.

We attain these objects by the mechanism illustrated in the accompanying drawing in which:—

Similar letters of reference refer to similar parts throughout the several views.

Figure 1:
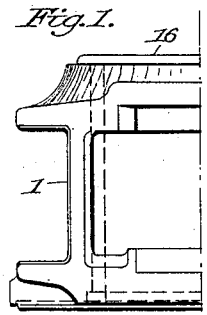
Fig. 1 is a plan view of one half of the journal box and bearing.
Figure 2:
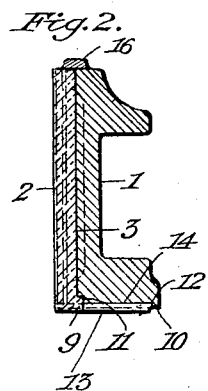
Fig. 2 is a sectional plan view of Fig. 4 on line 2—2.
Figure 3:
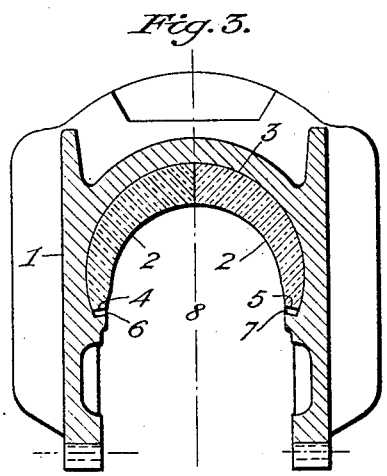
Fig. 3 is a sectional view on line 3—3 of Fig. 5.
Figure 4:
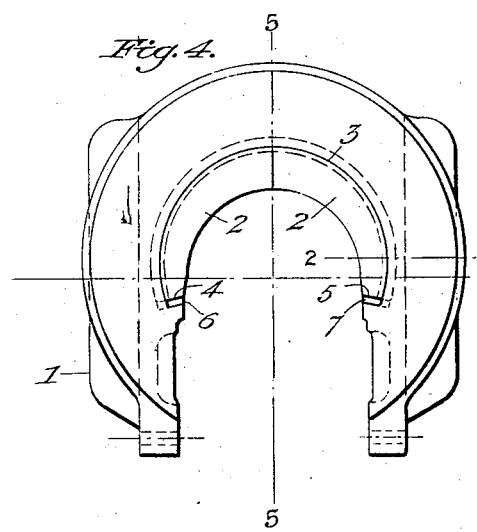
Fig. 4 is an end elevation of our journal bearing as it stands in the locomotive, the journal of the locomotive being shown in dotted lines.
Figure 5:
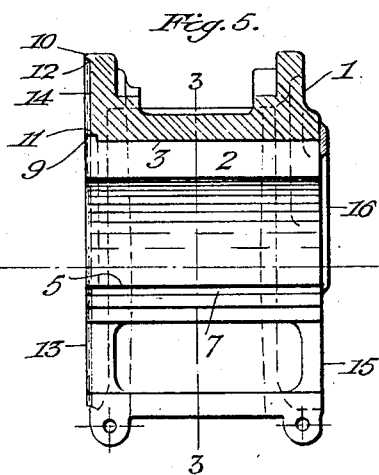
Fig. 5 is a sectional view of the journal box on line 5—5 of Fig. 4.

Referring to the drawing, the numeral 1 designates the journal box of our journal bearing. It may be made in any standard shape and size. The box is formed as illustrated with the recesses and projections usually employed in these boxes to secure them in their positions in the locomotive.

Our journal bearing has for its essential feature a bushing that is divided into two separate pieces 2 and 2. These pieces are curved on their inner periphery to fit the journal on which they are to rest and are curved on their outer peripheries to fit snugly but loosely enough to have a short rotary compensating movement against the bottom of a curved recess 3 formed in the box to receive them.

The opposite terminal ends 4 and 5 of our two bearing bushings are made shorter than the recess 3 to leave small spaces 6 and 7 at their ends when they are standing centrally in the recess 3. These spaces 6 and 7 allow the two parts of our bearing to expand when they are heated by the friction developed by the rotation of the journal against them.

The two separate pieces of our bearing bushing are preferably separated at the center of their lengths, consequently each is of the same length and the bearing is thus divided in the middle of it and at the apex of its circle and directly in vertical alignment with the vertical axis of the journal on which they rest. Our invention however, contemplates making these two parts of the bearing in two pieces of unequal lengths or in three pieces, if we so desire, of any predetermined lengths.

The two pieces of the bearing bushing we illustrate form two half parts of a semicircular sleeve shaped bearing, of a length of approximately equal to the thickness of the box. They are inserted into the axial bore 8 of the box from its front side and they fit so that they can move a limited extent rotatively and thereby adjust themselves to the journal. They also have freedom to expand and thus avoid the pinching of the journal which is a common fault of bearings secured with a tight fit in boxes when they are expanded by being heated.

The two half parts of our bearing are preferably provided with enlarged collar members 9 at their outer ends, which fit in the counterbore 11 in the front side 10 of the box. The collars are made slightly thicker than the depth of the counterbore to project a short distance from the front side 10 of the box. There is a thin projecting lip 12 at the front peripheral edge of the front side 10 of the box, defining a circumferential recess 14 formed between it and the projecting part of the collars of the divided bearing. This recess is filled with a metal such as brass or if preferred, with Babbitt metal 13, which receives the end thrust of the axle of the locomotive. When this metal wears down thin, it is removed and the recess is again filled with it. Should the outside surface of the collars of the two parts of the bearing wear away or from any accidental cause be broken away smaller than the bore of the box, the bearing would naturally move through and project beyond the rear side 15 of the box. One of the features of our invention however, is to prevent any inward lateral movement of the bearing members in the box and while there are several ways of preventing this movement, we prefer to prevent this lateral movement in the following manner. Upon the rear side 15 of the box we secure by any suitable means but preferably by electric welding, a thin steel ring 16, of a size to project partly over, and closely but loosely against the inner ends of the bearings, thus forming a rigid and strong abutment bearing against the inner ends of the two bearing members, and positively preventing possible accidental movement of them out of the rear end of the box. The two parts of the bushing are held firmly in the recess in the box solely by the means above described, instead of by the use of bolts, wedges, rivets or other retaining devices such as are used in some of the journal bearings at present in use.

Our bearing bushings are preferably made of a brass alloy, but our invention however, contemplates the use of any other kind of bearing members in the box.

On Sept. 18th, 1929 we completed and placed our journal bearing on a pair of wheels on locomotive No. 3605 on the D. & R. G. W. Railroad and they have been running steadily on the regular runs of this engine until a few days ago when they were examined and were found in perfect condition and their action has been perfect in preventing pinching of the journals of the wheels and they have not gotten as hot on this mountain road of many short and sharp curves as the regular form of journal boxes that have their journal bearing brasses or members pressed rigidly into their seats in the boxes.

Our invention is practical in every way for use on the fastest and heaviest locomotive engines and also on the journals of marine and flying machine engines where there is a continual vibratory movement that tends to heat up the bearings and expand them as they become hot, which decreases the effective driving power of the engine. While we have illustrated and described the preferred construction of our invention, we do not wish to be limited to the construction and arrangement shown, as changes may be made in it without departing from the spirit of our invention.

Having described our invention what we claim as new and desire to secure by Letters Patent is:

1. A journal box having, in combination, an arcuate bearing-receiving recess, and an arcuate bearing brass in said bearing-receiving recess, said bearing brass being in full contact along its outer surface with said arcuate bearing-receiving recess, the circumferential length of the bearing brass being substantially less than the contacting surface of the arcuate bearing-receiving recess to provide a space at each end of the bearing brass to permit expansion of the bearing brass, due to heat.

2. A journal box having, in combination, an arcuate bearing-receiving recess, a counter-bore in the box at one end of said recess, a retaining ring extending over the other end of the recess and fixed to the journal box, an arcuate bearing brass divided into two parts of equal length circumferentially, the combined circumferential length of said bearing brass being substantially less than the circumferential length of the corresponding contacting faces of the bearing-receiving recess, said bearing brass slidably fitted in said recess and abutting against said ring, a collar integral with one end of said bearing brass fitted within said counter-bore and projecting laterally a short distance therefrom, a lip on the outer edge of said journal box and defining with the projecting portion of said collar a second recess, and thrust-receiving metal filling in said second recess.

3. A journal box having, in combination, a curved bearing-receiving recess, a counter-bore in the box at one end of said recess, a metal ring fixed to the other end of the box and arranged to extend over said curved recess, a bearing brass divided axially into two equal parts, the combined circumferential length of said bearing parts being substantially less than the circumferential length of the corresponding contacting faces of the curved bearing-receiving recess, said bearing brass slidably fitted in said recess and abutting against said ring, a collar integral with the outer end of said bearing brass, fitting in said counterbore and projecting laterally a short distance therefrom, a lip on the outer edge of said journal box and defining with the projecting portion of said collar a second recess, and thrust-receiving metal filling in said second recess.

In testimony whereof, we affix our signatures.

WILLIAM J. O'NEILL.
WILLIAM E. IRVINE.